United States Patent [19]

Twerdochlib

[11] Patent Number: 4,833,931
[45] Date of Patent: May 30, 1989

[54] THERMALLY SELF-ADJUSTING MOUNT FOR PROXIMITY SENSOR

[75] Inventor: Michael Twerdochlib, Oviedo, Fla.

[73] Assignee: Westinghouse Electric Corp., Pittsburgh, Pa.

[21] Appl. No.: 85,510

[22] Filed: Aug. 14, 1987

[51] Int. Cl.$^4$ .............................................. G01N 3/00
[52] U.S. Cl. ................................................. 73/866.5
[58] Field of Search ............. 73/579, 660, 661, 866.5; 415/118; 248/DIG. 1; 374/208

[56] References Cited

U.S. PATENT DOCUMENTS

| | | | |
|---|---|---|---|
| 2,575,710 | 11/1951 | Hardigg | 324/207 |
| 3,850,015 | 11/1974 | Andresen | 324/208 |
| 4,023,756 | 5/1977 | Baker | 248/DIG. 1 |
| 4,196,390 | 4/1980 | Pitkin | 324/173 |
| 4,338,823 | 7/1982 | Iwasaki | 324/208 |
| 4,488,114 | 12/1984 | David et al. | 324/225 |
| 4,518,917 | 5/1985 | Oates et al. | 73/660 |
| 4,563,643 | 1/1986 | Leschek et al. | 324/207 |
| 4,573,358 | 3/1986 | Luongo | 73/660 |
| 4,612,501 | 9/1986 | Costello et al. | 324/208 |
| 4,644,270 | 2/1987 | Oates et al. | 324/207 |
| 4,688,909 | 8/1987 | Smith | 248/DIG. 1 |
| 4,756,191 | 7/1988 | Manson | 73/382 R |

FOREIGN PATENT DOCUMENTS 2914769 10/1979 Fed. Rep. of Germany .
55-135703 10/1980 Japan .
510645 6/1976 U.S.S.R. .
1033849 8/1983 U.S.S.R. .

Primary Examiner—Jerry W. Myracle
Assistant Examiner—Louis M. Arana
Attorney, Agent, or Firm—D. C. Abeles

[57] ABSTRACT

A thermally self-adjusting mount for a proximity sensor for detecting movement of a turbine blade tip within a turbine housing includes an elongated chamber in an interior wall of the turbine housing adjacent the path of travel of the turbine blade tip. The chamber is configured to receive a blade tip sensor therein and accommodate relative movement of the sensor toward and away from the path of travel of the blade tip. A thermally expansive element is operable coupled with the sensor for moving the latter in the chamber toward the path of travel of the blade tip upon heating of the sensor. A spring is provided for maintaining the sensor in contact with the thermally expansive element during both expansion and contraction of the latter. The thermally expansive member is capable, upon being heated to any given temperature, of causing movement of the sensor in the chamber and relatively toward the path of travel of the blade tip a distance which is substantially the same as the linear movement of the wall away from the path of travel due to having been heated to the same temperature. Thus, the spatial relationship between the sensor and the path of travel of the blade tip remains the same at different temperatures.

22 Claims, 2 Drawing Sheets

THERMALLY SELF-ADJUSTING MOUNT FOR PROXIMITY SENSOR

BACKGROUND OF THE INVENTION

1. Field of the Invention

The invention relates to proximity sensors and in particular to a thermally self-adjusting mount for controlling the position of such sensor.

2. Description of the Prior Art

Turbines and similar machines may include one or more blade rows connected to a rotating shaft member. The blades typically are of a complex design resulting in a multiplicity of vibrational modes. It has been found to be desirable to provide apparatus for monitoring blade vibration to anticipate and avoid damage to the turbine due to undesirable vibrational modes. Such apparatus is disclosed in prior U.S. Pat. Nos. 4,518,917 and 4,573,358, the entireties of the disclosures of which are hereby specifically incorporated by reference.

Generally speaking the apparatuses disclosed in the '917 and the '358 patents employ proximity sensors for monitoring blade vibration. Sensors of the eddy-current type have been found to be particularly suitable. Such sensors are well known and operate on the principle that the impedance of an AC-excited electrical coil is subject to change as the coil is brought in close proximity to a metal object. A suitable sensor which may be adapted for use in connection with the present invention is described in prior U.S. Pat. No. 4,563,643, the entirety of the disclosure of which is also hereby specifically incorporated herein by reference.

As illustrated particularly in the '358 patent identified above, the vibration of turbine blades may be monitored on-line by radially mounted blade tip sensors placed circumferentially about the bladed disk. In conducting such monitoring, it has been found that the gap between the blade tip and the sensor is a critical parameter in enabling the sensors to resolve the vibrating motion of individual blades. The minimum gap is determined by a number of physical considerations such as (1) the degree of permanent ovality of the sensor mount structure; (2) the irregularity of the blade length; (3) the difference in thermal expansion rates of the blades and sensor mount structure as the turbine is taken from equilibrium at ambient temperature to a steady state operating temperature; and (4) the non-uniform radial growth of the sensor mount structure due to gravity and asymmetrics induced by support points and gravity. The first of these considerations may be satisfied, if necessary, by initial sensor positioning and trimming of blade tips, respectively. Accordingly, in connection with the present invention, these two considerations are assumed to be minimized by techniques which are well known in the turbine art. Thus, the present invention deals with considerations (3) and (4).

The difference in the rate of thermal expansion of the blades and the sensor mount structure imposes a lower limit on blade tip sensor gap that restricts the use of magnetic sensors and turbine blade vibration monitoring systems. This results because the ligher blades reach operating temperature before the massive sensor mount structure. However, it is known for purposes of monitoring, that the gap between the blade tip and the sensor should generally be minimized to eliminate cross talk between the closely spaced steam turbine blades and to maximize the slope of the sensor signal as the blade passes.

The general chronology of the width of the gap during normal turbine start-up is as follows.

With the turbine at ambient temperature, a gap, g, exists between the blade tips and sensors. The turbine is heat soaked causing the blades to warm quickly and expand much faster than the massive sensor mount structure, thus reducing the gap to some small value g' which is much smaller than g. It is this initial start up period which determines the value of g and also the value of the minimum gap if considerations (1) and (2) mentioned above have in fact been eliminated. The heavier sensor mount structure then slowly heats up causing the gap to grow until the gap between the sensor and the blades is again the initial value g. The minimum running gap is thus determined by the maximum thermal disparity between the light blades and the massive sensor mount structure.

The foregoing considerations are well known in the turbine art and the linear displacement and/or position of each point in the turbine structure during initial start-up, steady state operation and shut-down is readily determinable by known empirical and comparative techniques. Manifestly, the initial gap between the blade tips and the sensors must be sufficient so that the blades may achieve their maximum lengths due to heat expansion before there is any linear movement of the turbine housing itself. Thereafter the housing expands outwardly and the initial gap is reestablished.

SUMMARY OF THE INVENTION

It is the purpose of the present invention to provide a passive sensor mount that permits continuous radial sensor adjustment to eliminate the effects outlined above and permit a reduction in the minimum gap between turbine blades and sensors during normal operation of the turbine. This purpose is accomplished through the use of a thermally self-adjusting mount for a proximity sensor for detecting movement of an object such as a turbine blade along a path in a hostile environment such as the environment inside the housing of the turbine.

The thermally self-adjusting mount of the present invention comprises means on a wall of a housing defining an inwardly opening chamber disposed adjacent the path of a moving object. The chamber is elongated and disposed to extend outwardly from the environment and through the wall and the same is configured to receive a proximity sensor therein and accommodate relative movement of the sensor in the chamber toward and away from the path. Thermally responsive means operably coupled with the sensor are provided for moving the latter toward the path upon heating. In accordance with a particularly valuable aspect of the invention, the thermally responsive means is capable, upon being heated to any given temperature, of causing movement of the sensor in the chamber relatively toward the path of travel of a turbine blade a distance which is substantially the same as the linear outward movement of the wall of the housing occasioned by having been heated to such given temperature. Thus, the spatial relationship between the sensor and the path of travel of the blade remains the same at different temperatures.

In accordance with the invention, means operably coupled with the sensor are provided for resiliently urging the sensor in a direction in the chamber away from the path. Such resilent means maintains the operable contact between the thermally responsive means and the sensor.

In accordance with the invention, the thermally responsive means comprises a thermally expansive member arranged to push the sensor toward the path of the moving object upon expansion. The member is characterized by a coefficient of linear expansion and a dimension in a direction longitudinally of the chamber such that the total increase in such dimension upon heating of the sensor to a given temperature is substantially the same as the linear outward movement of the housing wall occasioned by heating the latter to the same given temperature.

In a preferred aspect of the invention, the sensor is provided with a flange extending laterally outwardly therefrom and the thermally expansive member is disposed to push against the flange upon expansion. In a particularly preferred form of the invention the sensor has a cylindrical shape and the flange comprises an annular ring extending around the periphery of the cylinder. In accordance with this form of the invention, the expansive member is configured with a complimentary annular shape. In such preferred form of the invention, the resilient means comprises coil spring means disposed to act against the annular ring.

DETAILED DESCRIPTION OF THE PREFERRED EMBODIMENTS

Figure 1:
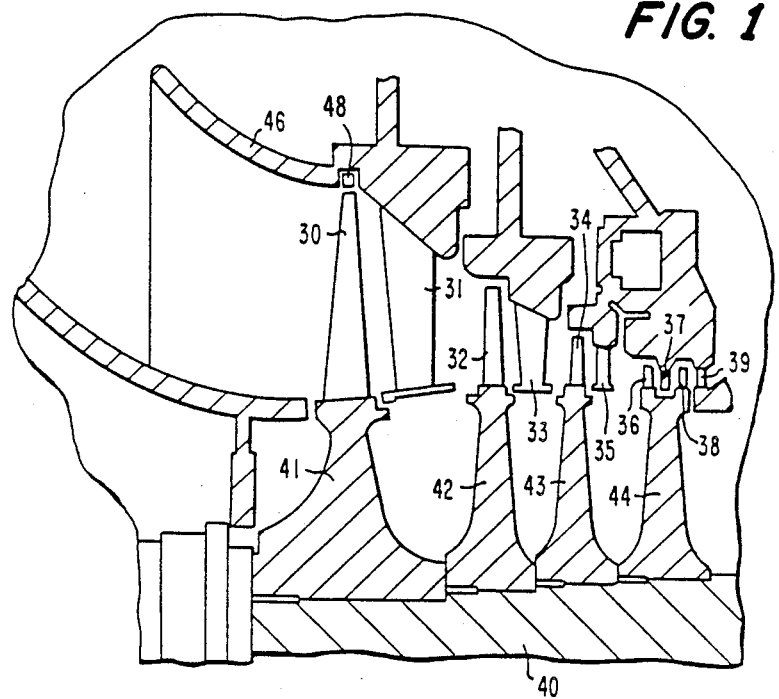
FIG. 1 is a cross-sectional view of a portion of a steam turbine in which the present invention may be utilized.

Although the invention has general application for sensing the proximity of an object moving along a path in a hostile environment contained within a housing, and in particular is applicable to a variety of rotating blade structures, the invention will be described by way of example with respect to the monitoring of the last blade row in a low pressure steam turbine, a portion of which is illustrated in FIG. 1. The turbine includes a plurality of turbine blades 30 through 39 with the even-numbered blades being connected to a rotor 40 by means of rotor disks 41 through 44. The even-numbered blades extend symmetrically about the rotor in respective blade rows and are termed rotor blades. The odd-numbered blades are connected to, and extend around, an inner turbine cylinder and are stationary blades.

In a typical operation, superheated dry steam enters the first stage (constituted by blades 38 and 39) and passes through subsequent stages where expansion and temperature and pressure changes take place. Steam exits the last stage (constituted by blades 30 and 31) via a flow guide 46.

Blade 30 as well as all of the other blades in that blade row, are free-standing blades and sensors may be positioned in apertures machined in the flow guide so as to be adjacent the tips of the blade. FIG. 1 illustrates a typical sensor, 48, so positioned. The present invention has to do with the mounting for a sensor such as the sensor 48 and other similar sensors and it is to be appreciated that the invention is particularly useful in connection with the turbine blade vibration detection apparatus of the '358 patent identified above. In such application a plurality of sensors such as the sensor 48 are disposed equally about a blade row in a turbine.

Figure 2:
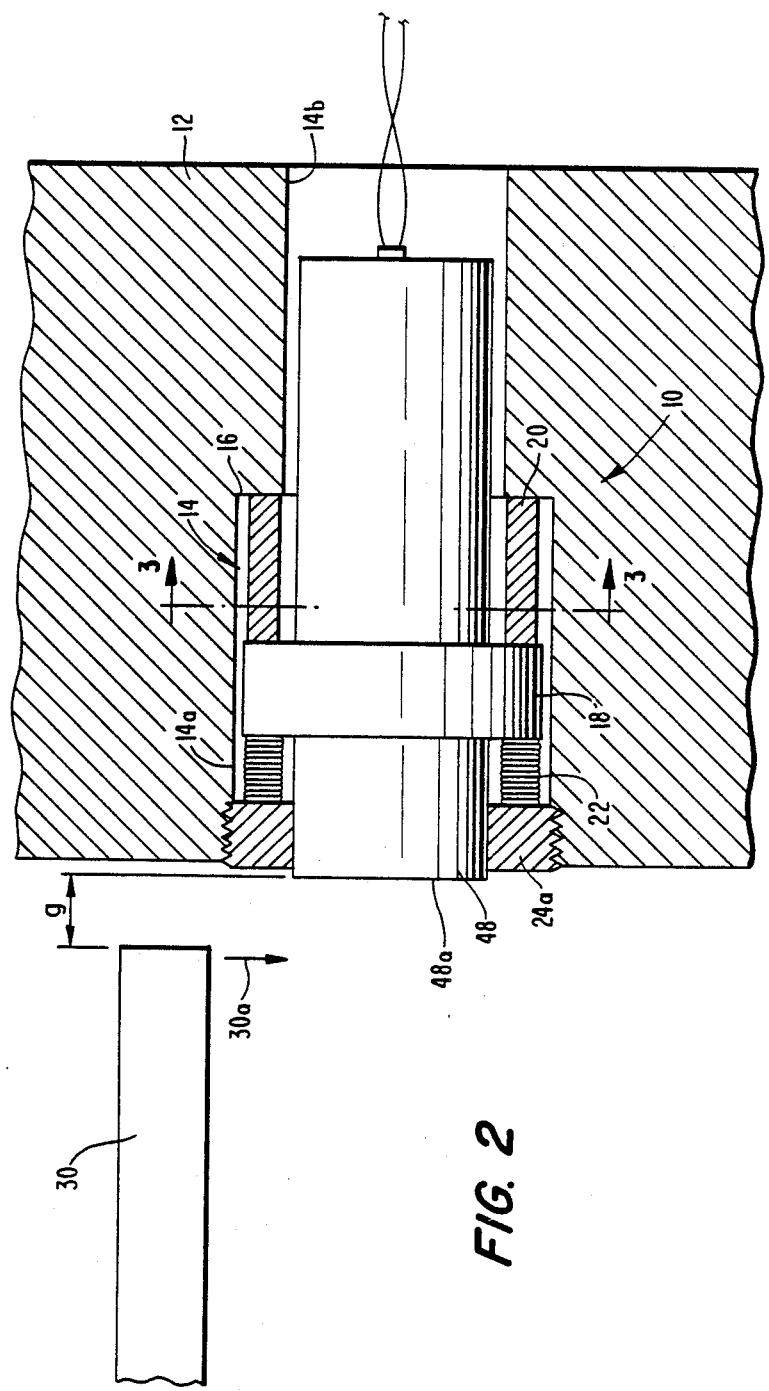
FIG. 2 is a schematic cross-sectional view illustrating the thermally self-adjusting mount of the present invention and its operational relationship to a turbine blade.

The thermally self-adjusting mount of the present invention is illustrated broadly by the reference numeral 10 in FIG. 2 of the drawings. FIG. 2 is a schematic cross-sectional view which illustrates the interrelationship of the blade 30 and a sensor 48. The center of rotation of the blade is disposed to the left of sensor face 48a and the blade 30 has a path of travel in the direction of arrow 30a. The distance or gap between path of travel 30a and face 48a of the sensor during operation of the turbine is illustrated by the dimension g in FIG. 2.

Sensor 48 may be mounted in an aperture machined directly into a wall of the turbine housing as illustrated in the '917 patent or in a retainer which may be specially fabricated for a particular machine as illustrated in the '358 patent described above. In either case, means are provided on a wall 12 of the turbine defining an inwardly opening chamber 14 which is disposed adjacent the path of travel 30a of blade 30. As can be seen viewing FIG. 2, chamber 14 is elongated and disposed to extend away from path 30a and through wall 12. Chamber 14 is configured to receive proximity sensor 48 therein and accommodate movement of sensor 48 in chamber 14 toward and away from path 30a.

Figure 3:
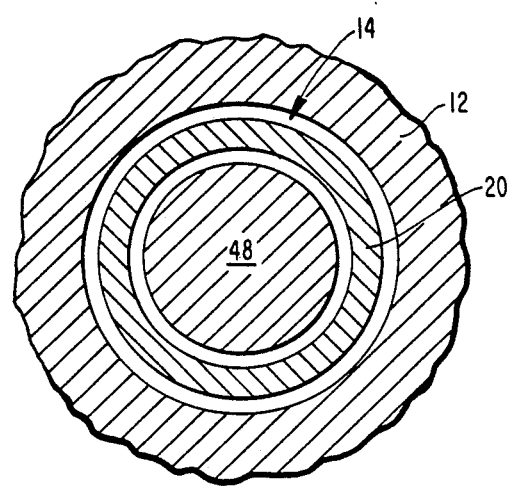
FIG. 3 is a cross-sectional view taken along the line 3—3 of FIG. 2.

Chamber 14 preferably has a round cross-sectional configuration as particularly illustrated in FIG. 3, and within chamber 14 at a location remote from the path of travel 30a of blade 30, an annular shelf 16 is provided dividing chamber 14 into a portion 14a having a relatively larger diameter and a portion 14b having a relatively smaller diameter.

Sensor 48 preferably has a cylindrical shape and a cross-sectional configuration which is round as can be seen in FIG. 3. Sensor 48 is provided with a flange or annular ring 18 which extends around the periphery of sensor 48. Flange 18 has an outer diameter which is slightly less than the inner diameter of chamber portion 14a whereas the main cylindrical body of sensor 48 has an outer diameter which is slightly less than the inner diameter of chamber portion 14b, all as can be seen viewing FIG. 2.

A thermally expansive member 20 is disposed between shelf 16 and flange 18. On the other side of flange 18, spring means in the form of a series of coil springs 22 is interposed between flange 18 and an annular, threaded bushing 24 which is threaded into wall 12. Bushing 24 has an internal hole 24a which is shaped to accommodate the periphery of sensor 48 adjacent sensor face 48a.

Thermally expansive member 20 preferably has an annular shape, as can best be seen in FIG. 3, and it can be seen viewing FIG. 2 that upon thermal expansion of member 20 the same will expand between shelf 16 and flange 18 to push the latter and the sensor against the bias of springs 22 and toward the path of travel 30a of blade 30. Spring means 22 is provided simply to keep flange 18 tightly engaged with member 20 and facilitate the retraction of sensor 48 when member 28 cools and thus decreases in size. Although as shown in FIG. 2 spring means 22 consists of a plurality of spaced small coil springs, it will be appreciated by the routineer that means 22 may just as well be comprised of a single coil spring placed about sensor 48 in coaxial alignment therewith.

Preferably member 20 should have a thermal expansion coefficient which is approximately 120 times as great as the thermal expansion coefficient of steel. In this manner, a member 20 which is approximately ½ inch long is sufficient to provide a passive centripetal displacement that just compensates for the radial thermal expansion of sensor mount structure 12. As set forth above, it is well within the skill of the routineer in the relevant art to determine the physical position of wall 12 at various times during the heating of the turbine. Moreover, the exact position of wall 12 during steady state operation is known or can be calculated by one skilled in the relevant art using empirical and/or comparative data. Thus, the total expansion of member 20 necessary to offset the linear displacement of wall 12 is a known quantity or a quantity which may be calculated using routine skill. If the thermal expansion co-efficient of the material of construction of member 20 is known, the necessary room temperature length thereof may be readily calculated.

With regard to the material of construction of member 20, there are a number of known plastic and ceramic materials which are suitable, the only real criteria being that the same be capable of withstanding the temperatures encountered in turbine operation. And if it is necessary to confine a hostile environment within the housing, member 20 may be sealingly attached to shelf 16 and flange 18 using known technology which does not form a part of the present invention. Moreover, member 20 could be in the form of an annular bellows rather than in the form of a solid member as shown in FIG. 2.

The chronology of the blade tip to sensor gap during start-up is as follows. At ambient temperatures the gap between the blade tips and the sensors is the distance g. As the turbine is heat soaked, the blades of the turbine lengthen and the gap between the tip of the blade and the sensor face 48a decreases to a distance g' which is greater than zero but much less than g. As the massive sensor mount structure 12 slowly warms and expands away from path of travel 30a of blade 30, thermally expansive member 20 expands within chamber 14 and pushes flange 18 and sensor 48 toward path 30a. The material of construction of member 20 is selected such that at any given temperature its total expansion from its initial length is exactly the same as the linear outward movement of wall 12 occasioned by having been heated to such given temperature. Thus, the spatial relationship between face 48a of sensor 48 and path of travel 30a of blade 30 remains always the same even at different temperatures. The net effect is that during normal steady state operation, the gap between path of travel 30a and face 48a remains at the small value g'.

In accordance with the concepts and principles of the present invention, the thermally expansive member 20 could be constructed using a bi-metallic spring or bellows, a high temperature plastic cylinder or any other thermally expansive material. In this connection, the degree of expansion is controlled by the thermal expansion coefficient of the material and the length of the member. Moreover, it is within the contemplation of the invention that the movement of sensor 48 could be accomplished using a rotating bi-metallic spring to effect a centripetal advance of the sensor through a thread feed arrangement. It is also anticipated that an externally controlled heater might be utilized in combination with the thermally expansive member. Such heater may be controlled by a feed back signal so that a preselected gap is maintained for various turbine operating conditions. Thus, automatic control of the gap between blade tip and sensor might be achieved. All of the foregoing are within the contemplation and scope of the present invention which simply provides thermally responsive means operably coupled with the sensor for moving the latter in the chamber toward the path of travel of blade 30.

I claim:

1. A thermally self-adjusting mount for a sensor for sensing movement of a turbine blade tip within a turbine housing, said mount comprising:

means on an interior wall of said housing defining an inwardly opening chamber disposed adjacent the rotational path of travel of a turbine blade tip during turbine operation, said chamber being elongated and disposed to extend away from said path of travel and through said wall and being configured to receive a blade tip sensor therein and accommodate relative movement of the sensor in the chamber toward and away from said path of travel;

means operably coupled with the sensor for resiliently urging the latter in a direction in the chamber away from said path of travel;

thermally responsive means operably coupled with the sensor for moving the latter in said chamber toward said path of travel upon heating of the sensor, said thermally responsive means being capable, upon being heated to any given temperature, of causing movement of the sensor in the chamber and relatively toward the path of travel a distance which is substantially the same as the linear movement of the wall away from said path of travel occasioned by having been heated to such given temperature, whereby the spatial relationship between the sensor and the path of travel of the blade tip remains the same at different temperatures.

2. A self-adjusting mount as set forth in claim 1 wherein said thermally responsive means comprises a thermally expansive member arranged to push the sensor toward said path of travel upon expansion, said member being characterized by a coefficient of linear expansion and a dimension in a direction longitudinally of the chamber such that the total increase in said dimension upon heating of the sensor to a given temperature is substantially the same as the linear outward movement of the turbine wall occasioned by heating the latter to the same given temperature.

3. A self-adjusting mount as set forth in claim 2 wherein said sensor is provided with a flange extending laterally outwardly therefrom, and said member is disposed to push against the flange upon expansion.

4. A self-adjusting mount as set forth in claim 3 wherein said sensor has a cylindrical shape and said flange comprises an annular ring extending around the periphery of the cylinder, said member being configured with a complimentary annular shape.

5. A self-adjusting mount as set forth in claim 1 wherein said resilient means comprises coil spring means.

6. A self-adjusting mount as set forth in claim 2 wherein said resilient means comprises coil spring means.

7. A self-adjusting mount as set forth in claim 3 wherein said resilient means comprises coil spring means disposed to act against the flange.

8. A self-adjusting mount as set forth in claim 4 wherein said resilient means comprises coil spring means disposed to act against the annular ring.

9. A self-adjusting mount as set forth in claim 8 wherein said coil spring means comprises a plurality of springs spaced around said ring.

10. In combination,
an elongated proximity sensor having means at one end thereof for detecting movement of an object along a path in a hostile environment contained in a housing; and
thermally self-adjusting mounting means for positioning the sensor with said one end thereof projecting into the interior of the housing to a position in operable proximity to said path, said mounting means comprising,
means mountable in a wall of said housing defining an elongated chamber having an opening disposed adjacent said path and an internal abutment facing said opening, said chamber being disposed to extend away from the path and through the wall and being configured to receive said sensor therein with said one end of the sensor extending through said opening and to accommodate relative movement of the sensor in the chamber toward and away from said path, and
a thermally expansive member interposed between said sensor and said abutment and calibrated to expand linearly with increased temperature an amount which is essentially the same as the outward expansion of the wall away from said path.

11. The invention of claim 10 wherein said thermally expansive member is arranged to push the sensor toward said path upon expansion, said member being characterized by a coefficient of linear expansion and a dimension in a direction longitudinally of the chamber such that the total increase in said dimension upon heating of the sensor to a given temperature is substantially the same as the linear outward movement of the housing wall occasioned by heating the latter to the same given temperature.

12. The invention of claim 11 wherein said sensor is provided with a flange extending laterally outwardly therefrom, and said member is disposed to push against the flange upon expansion.

13. The invention of claim 12 wherein said sensor has a cylindrical shape and said flange comprises an annular ring extending around the periphery of the cylinder, said member being configured with a complimentary annular shape.

14. The invention of claim 10 wherein is included means operably coupled with the sensor for resiliently urging the latter in a direction in the chamber away from said path.

15. The invention of claim 14 wherein said resilient means comprises coil spring means.

16. The invention of claim 14 wherein said thermally expansive member is arranged to push the sensor toward said path upon expansion, said member being characterized by a coefficient of linear expansion and a dimension in a direction longitudinally of the chamber such that the total increase in said dimension upon heating of the sensor to a given temperature is substantially the same as the linear outward movement of the housing wall occasioned by heating the latter to the same given temperature.

17. The invention of claim 16 wherein said resilient means comprises coil spring means.

18. The invention of claim 16 wherein said sensor is provided with a flange extending laterally outwardly therefrom, and said member is disposed to push against the flange upon expansion.

19. The invention of claim 18 wherein said resilient means comprises coil spring means disposed to act against the flange.

20. The invention of claim 18 wherein said sensor has a cylindrical shape and said flange comprises an annular ring extending around the periphery of the cylinder, said member being configured with a complimentary annular shape.

21. The invention of claim 20 wherein said resilient means comprises coil spring means disposed to act against the annular ring.

22. The invention of claim 21 wherein said coil spring means comprises a plurality of springs spaced around said ring.

* * * * *